United States Patent [19]

Fontanel et al.

[11] 4,076,667
[45] Feb. 28, 1978

[54] GRANULES AND PELLETS FOR THE MODIFICATION OF POLYCONDENSATES WHICH CAN BE SHAPED, AS WELL AS THE PROCESS FOR OBTAINING THESE GRANULES AND PELLETS AND SHAPED ARTICLES THUS OBTAINED

[75] Inventors: Daniel Fontanel, Bron; Jean Rampin, Theoule-sur-Mer, both of France

[73] Assignee: Rhone-Poulenc Textile, France

[21] Appl. No.: 666,345

[22] Filed: Mar. 12, 1976

[51] Int. Cl.$^2$ .................... C08L 67/00; C08L 77/00
[52] U.S. Cl. ................. 260/22 A; 260/37 N; 260/37 NP; 260/37 P; 260/40 R; 264/DIG. 56; 264/DIG. 61
[58] Field of Search ............ 260/22 A, 37 N, 37 NP, 260/37 P, 40 R; 264/140-142, DIG. 61, DIG. 56

[56] References Cited

U.S. PATENT DOCUMENTS

| | | | |
|---|---|---|---|
| 2,755,509 | 7/1956 | Smidth | 264/140 |
| 2,857,624 | 10/1958 | Hanzel et al. | 264/141 |
| 3,032,821 | 5/1962 | Booys et al. | 264/DIG. 56 |
| 3,694,402 | 9/1972 | Essam | 260/37 NP |
| 3,905,937 | 9/1975 | Khanna | 260/37 P |
| 3,923,726 | 12/1975 | Benz | 260/37 N |

FOREIGN PATENT DOCUMENTS

| | | | |
|---|---|---|---|
| 656,437 | 1/1963 | Canada | 264/140 |
| 2,206,393 | 7/1974 | France | 260/40 R |
| 2,185,225 | 12/1973 | France. | |
| 95,995 | 8/1960 | Netherlands. | |

*Primary Examiner*—Ronald W. Griffin
*Attorney, Agent, or Firm*—Stevens, Davis, Miller & Mosher

[57] ABSTRACT

The present invention relates to masterbatches in the form of granules or pellets, as well as the process for obtaining these.

These granules or pellets consist of:

at least 37.5% of polycondensates serving as a carrier, of which at least a part consists of the same polycondensate as that which is to be shaped, in the form of a powder of particle size at least 50 microns, from 12.5 to 40% of a binder of melting point 70° – 100° C which is compatible with the polycondensate to be shaped, and up to 50% of at least one compound intended to modify the polycondensate to be shaped.

They are used with advantage for modifying polycondensates, particularly polyamides and polyesters, intended for spinning or moulding.

7 Claims, No Drawings

GRANULES AND PELLETS FOR THE MODIFICATION OF POLYCONDENSATES WHICH CAN BE SHAPED, AS WELL AS THE PROCESS FOR OBTAINING THESE GRANULES AND PELLETS AND SHAPED ARTICLES THUS OBTAINED

The present invention relates to granules and pellets for the modification of spinnable and mouldable polycondensates, the process for obtaining these granules and pellets, and the spun or moulded products which have been modified in this way.

French Application 73/25,512 filed on 11.07.73 by the applicant company for "Composition for Colouring Plastic Polymers and Coloured Polymers" has already disclosed compositions of viscosity at least 1,000 poises at ordinary temperature, intended for colouring spinnable polymers, the compositions consisting exclusively of the dyestuff which is soluble in the polymer to be shaped, in a proportion of 20 to 60% relative to the weight of the mixture, and a coating polymer of low melting point such as poly(ethylene glycol sebacate), the said compositions being obtained by mixing the dyestuff and the coating polymer so as to coat the dyestuff with the said coating polymer, followed by casting on at a cooling belt and crushing to give particles of irregular dimensions.

However, the particles thus obtained, of irregular dimensions, produce dusts which are objectionable when handling the particles, and the large proportion of poly(ethylene glycol sebacate) in the said compositions has the effect of detracting from the quality, and raising the price, of the yarns thus obtained. Furthermore, the process for obtaining the particles is long and rather unprofitable.

A process has also been disclosed, by French Application 2,206,393 published on 7th June 1974, for preparing shaped articles of a linear polyester by adding, to the polyester in the molten state, a mixture of an additive and a linear polyester in the form of a powder of apparent density not exceeding 0.3 g/ml; in practice the additive consists solely of inorganic or organic pigments which are adsorbed on the surface of the polyester powder particles, the latter having to be ground beforehand in accordance with special and expensive processes.

According to this application, the preparation of tablets, pellets or granules is carried out in accordance with any conventional means such as passing the mixture through a screw extruder, that is to say by melting of the polymer itself, and hence at a temperature at least equal to the melting point of the polymer, which results in a degradation of the polyester, with lowering of the viscosity, due to hydrolysis. Furthermore, this process is expensive because it requires the use of an extruder and, where filaments or fibres are produced, the pigments must be ground so as to bring them to micron size, to enable them to be used.

Granules and pellets for modifying polycondensates intended to be shaped in the molten state have now been found, characterised in that they consist of:

at least 37.5% of polycondensates serving as a carrier, of which at least a part consists of the same polycondensate as that which is to be shaped, in the form of a powder of particle size at least 50 microns, from 12.5 to 40 % of a binder of melting point 70°-100° C which is compatible with the polycondensate to be shaped, and up to 50% of at least one compound intended to modify the polycondensate to be shaped.

Where several polycondensates are used as the carrier, the proportion of polycondensate to be shaped must be at least 15% by weight relative to the mixture consisting of the granules or pellets.

The present invention also relates to a process for obtaining the said granules and pellets for the modification of polycondensates, characterised by the following stages:

The polycondensates whch are to be shaped or which serve as a carrier are brought to the form of a powder of particle size at least 50 microns, in accordance with any known process, the polymer or polymers thus obtained, the fusible binder and the modifier or modifiers are mixed and densified in a turbo-mixer for a period of 3 minutes to 15 minutes, at a starting temperature which can range from ambient temperature to about 120° C, with the temperature of the mass, at the end of the operation, having to be above the melting point of the binder, and the mixture thus obtained is formed into granules on a compacter or into pellets on a pelletiser.

The invention also relates to any articles in the form of yarns, fibres or moulded objects which have been modified by the granules or pellets according to the present invention. These granules and pellets can be used for modifying spinnable or mouldable polycondensates.

By spinnable polycondensates there are understood polyesters such as poly(ethylene glycol terephthalate), poly-(1,4-butanediol terephthalate) and the like, the copolyesters as well as the mixtures obtained from polyesters or copolyesters, polyamides of the type of polyhexamethyleneadipamide and polycaprolactam, copolyamides, mixtures of polyamides, polyolefines and the like.

By mouldable polycondensates there are understood, for example, the polyamides of the polyhexamethyleneadipamide and polycaprolactam type, the copolyamides, certain polyesters such as poly(1,4-butanediol terephthalate) which may or may not be branched, for example with 0.05 - 3 mol % of a branching agent, and the like.

More precisely, the granules or pellets intended to be mixed with the polycondensates intended for spinning contain essentially, as the modifier, up to 50% of at least one dyestuff which is soluble in the polycondensate which is to be shaped, chosen so that it withstands a temperature which is at least about 10% higher than the melting point of the polymer to be shaped, for at least 15 minutes.

The soluble dyestuffs for polyesters which are suitable for carrying out the present invention are the following:

Azo condensation dyestuffs such as "Yellow 4610" (of CIBA-GEIGY), benzimidazole derivatives such as C.I. Solvent Yellow 106, anthraquinone derivatives such as "Filomon Yellow T 2G" (I.C.I.), "Waxoline Ruby IR" of I.C.I., "RPE Blue for thermoplastics" (P.C.U.K.), C.I. Solvent Blue 45 substituted aminoanthraquinones such as C.I. Solvent Green 3 (C.I. 61,565), perinone derivatives such as C.I. Solvent Red 135 (P.C.U.K.) and C.I. Solvent Red 162, thioindigo derivatives such as C.I. Pigment Red 181, copper phthalocyanine derivatives such as copper phthalocyanine-sulphonamide, such as C.I. Solvent Blue 67, certain indigo derivatives such as C.I. Vat Red 41 (C.I. 73,300), acid dyestuff bases such as "Blue RM 1267" (SANDOZ) and "Red RM 1264" (SANDOZ), xanthene derivatives such as C.I. Solvent Yellow 98 or C.I. Solvent Orange 63, and certain monoazo dyestuffs which can, just, be suitable though they are at the limit of stability, such as C.I. Disperse Brown 4 or C.I. Disperse Red 72.

It is obvious that mixtures of several dyestuffs with one another can also be used.

Certain dyestuffs sold commercially are already mixtures, such as Black PLS-PS for thermoplastics from Produits Chimiques UGINE-KUHLMAN (a mixture of an anthraquinone dyestuff and a perinone derivative).

The following dyestuffs can be used for polyamides:

Metallized azo dyestuffs such as C.I. Solvent Yellow 83, C.I. Solvent Red 92, C.I. Acid Red 313, C.I. Acid Red 359, C.I. Solvent Yellow 21 and Telasol Yellow RLSN (SANDOZ), and certain anthraquinone dyestuffs such as C.I. Acid Blue 80.

In the case of the polycondensates intended for spinning, the most advantageous fusible binder which can be used is poly(ethylene glycol sebacate) though other compounds of melting point between 70° and 100° C which are compatible with the polycondensate to be spun can also be used, for example stearic acid and saponified esters of montan acids possessing 26 to 32 carbon atoms in the molecule, sold by Hoechst under the trade mark "OP Wax"; certain fusible agents can be used as a mixture, such as poly(ethylene glycol sebacate) and "OP Wax".

Simultaneously with the soluble dyestuffs, other compounds can be incorporated into the granules or pellets, in minor amounts, provided they are fusible in the polymer which is to be shaped.

In the case of the polycondensates intended for moulding, the modifiers used are preferably varius pigments and adjuvants, in a proportion of less than or equal to 50%, which are dispersable in the compositions to be moulded.

In the sense of the present invention, adjuvants are considered to be all the products capable of improving certain properties of the compositions to be moulded:

Light stabilisers such as manganese acetate or manganese hypophosphite and preferably manganese stearate, heat stabilisers such as mixtures of ammonium bromide or potassium bromide or sodium bromide and copper stearate, or the mixture of copper acetate and potassium iodide, crystallising agents or nucleating agents which improve the uniformity of crystallisation of the moulded polymer, such as calcium phenylphosphonate and talc, delustring agents such as anatase or rutile titanium oxide, preferably anatase (for obtaining very white products) which has undergone an organophilic surface treatment (with silicone), and flameproofing agents, in particular red phosphorus, violet phosphorus and black phosphorus, which are very particularly suitable for plastics to be moulded, which are filled with glass fibres (in particular polyamides).

The adjuvants cited above are generally used as a mixture with pigments in various proportions, so that the total proportion of adjuvants and pigments does not exceed 50% by weight of the mixture of which the granules of pellets consist.

In the particular case of the polyamides for moulding, a part of the polyamide to be moulded can be replaced by a different polycondensate which also acts as a carrier, for example by poly(ethylene glycol terephthalate) powder, which also favours crystallisation in such mixtures. Under these conditions, it suffices if the total proportion of polyamide and of poly(ethylene glycol terephthalate) powder is at least 37.5% by weight of the mixture of which the granules or pellets consist. However, the proportion of the polyamide must be at least 10% relative to the total mixture of which the granules consist. This makes it possible, in certain cases, to prepare the granules or pellets according to the invention whilst avoiding grinding of a part of the polycondensate which is to be moulded.

Pigments which can be used are all known organic or inorganic pigments generally used in the production of plastics. They can be used without prior grinding.

As fusible binders for granules or for pellets intended to be mixed with the moulding compositions there may be mentioned poly(ethylene glycol sebacate), "OP Wax", which also serves as a mould release agent, or their mixture.

The granules or pellets according to the present invention are obtained in the following manner:

The polycondensates are converted to a more or less fine powder; in general, its particle size is greater than 50 microns, but can range up to 300 microns in the case of the polyesters and 400 microns in the case of the polyamides. Grinding can be carried out in accordance with any conventional process which entails little work, for example on a edge runner operating dry, as the particle does not have to have any particular surface, contrary to the polyester described in French Application 2,206,393.

All the fillers to be incorporated in the granules or pellets are mixed dry, in the form of powders, and densified very rapidly on a turbo-mixer, so as to increase the apparent density of the products. This operation can be carried out in the cold, in which case self-heating of the particles by friction against one another in any case occurs. It is also possible to carry out the process hot, at the melting point of the fusible binder, which liquefies and coats the mixture. The duration of the operation depends on the temperature; if the mixture is heated at the start to the melting point of the fusible agent, it is of the order of a few minutes, for example two to three minutes. If the start of the operation takes place cold, the duration of the operation can range up to at most 15 minutes, the rise in temperature taking place through self-heating.

This densification operation already makes it possible to impart a degree of cohesion to the various powders introduced, due to the presence of the fusible agent. The latter is used in a proportion of 12.5 to 40% relative to all the fillers combined. Above 40%, an agglomeration of the fillers takes place, which renders the products unusable. Various commercial types of turbo-mixers can be used, such as the Henschel, Diosna, Papenmeier and Moritz types.

The densified mixture thus obtained is then moulded into granules or pellets on a granulator, for example on a Hutt (trade mark) type G granulator.

The product must be introduced hot, at least at 50° C, into the granulator, the granulating rollers being kept at a temperature equal to or slightly above the melting point of the fusible agent, for example 50° to 70° C in the case of stearic acid and 80° to 110° C in the case of poly(ethylene glycol sebacate) and "OP Wax". The granules are allowed to cool on issuing from the apparatus and thus become very hard. They can be introduced continuously into an extruder, by means of a metering weigher, for the purpose of being mixed with the polymer which is to be shaped.

After densification, the masterbatch can also be pelletised, hot or cold, with any type of commercial pellitiser such as those used in pharmacy, the pellets thereafter being introduced into the extruders in the same way as the granules, for example by means of a metering weigher.

On issuing from the extruder, where the pellets are mixed with the polymer to be shaped, it is possible either directly to spin the molten polymer, in the case where a polymer intended for spinning is concerned, or to extrude and granulate a strand consisting of the modified polymer, which can then be spun or moulded in the usual manner. This second process, which is discontinuous, makes it possible easily to transport the modified polymer in the form of granules, whilst the first process permits continuous spinning, which is of obvious economic value.

Where it is desired to obtain filaments, these are melt-spun, stretched and, if desired, treated in the usual manner, by any of the means well known to those skilled in the art. The yarns have good general fastness properties.

Where plastics are obtained, the moulding, which is effected discontinuously, can be carried out in accordance with any process well known to those skilled in the art, which allows easy simultaneous introduction of all kinds of modifiers.

The examples which follow and in which the parts are by weight, are given by way of indication but without implying a limitation in order to illustrate the invention.

In these same examples, the C.I. references of the dyestuffs cited are in accordance with the Colour Index, 1971 edition.

EXAMPLE 1

The following fillers are introduced into a high speed mixer of the "Papenmeier TEGHK 8" (trade mark) type:

| | |
|---|---|
| Yellow RPE (benzimidazole derivative) | 280 g (14%) |
| Brown D 3 R (azo compound) | 160 g (8%) |
| Black PLS PS (anthraquinone derivative tinted with a perinone red) | 40 g (2%) |
| Poly(ethylene glycol terephthalate) powder of mean particle size 250 microns | 1,270 g (63.5%) |
| Poly(ethylene glycol sebacate) powder, melting point 73° C | 250 g (12.5%) |

Mixing is carried out for two minutes at a speed of 1,500 rpm and for two minutes at 2,000 rpm, the temperature at the end of the densification process being about 70° C.

The masterbatch, which has been densified and heated to 50° C, is then granulated on a HUTT G 25-40 (trade mark) apparatus, the duration of the operation being 3.75 minutes and the temperature of the granulation rollers being maintained by circulation of oil at 120° C.

The granules obtained have very good cohesion; they are mixed with poly(ethylene glycol terephthalate) at the rate of 1 part per 100 parts and the mixture is spun at a temperature of 280° C.

Filaments of a homogeneous ochre colour of good general fastness properties are obtained.

EXAMPLE 2

The following fillers are introduced into a high speed mixer of the "Papenmeier" TEGHK 8 (trade mark) type:

| | |
|---|---|
| Brown D3R (I.C.I.) | 342 g (11.4%) |
| Solvent Red 52 68,210 (I.C.I.) | 9 g (0.3%) |
| Black PLS PS (P.C.U.K.) | 78 g (2.6%) |
| Poly(ethylene glycol terephthalate) powder of mean particle size 250 microns | 2,121 g (70.7%) |
| Poly(ethylene glycol sebacate), melting point 73° C | 450 g (15.0%) |

Mixing is carried out for 3 minutes at a speed of 1,000 rpm and for two minutes at 1,500 rpm, the temperature at the end of the densification process being about 50° C.

The densified masterbatch, at a temperature of 50° C, is then granulated in a HUTT G 25-40 granulator by passing it between rollers heated by circulating oil maintained at 125° C. The granules obtained, which are intended for spinning, have good cohesion.

EXAMPLE 3

The following mixture is densified with the same apparatus as that used in Example 1:

| | |
|---|---|
| Black PLS PS (P.C.U.K.) | 240 g (12%) |
| Solvent Blue 45 | 240 g (12%) |
| "OP Wax" (saponified ester of montan acid, melting point 80 to 100° C) | 300 g (15%) |
| Poly(ethylene glycol terephthalate) powder of mean particle size 250 microns | 1,220 g (61%) |

Mixing is carried out for three minutes at a speed of 1,000 rpm and for two minutes at 1,500 rpm, the temperature at the end of the densification process being about 70° C.

The densified product thus obtained is introduced at a temperature of 50° C into a HUTT G 25-40 type granulator, the temperature of the rollers being maintained by oil at 125° C. The granules obtained, intended for spinning, have good cohesion.

EXAMPLE 4

The following mixture is densified with the same apparatus as that used in Example 1:

| | |
|---|---|
| Titanium dioxide, $TiO_2$ | 1,500 g (50%) |
| Poly(ethylene glycol terephthalate) powder | 300 g (10%) |
| "OP Wax" (melting point 80° – 100° C) | 150 g (5%) |
| Poly(ethylene glycol sebacate), melting point 73° C | 225 g (7.5%) |
| Polyhexamethyleneadipamide (mean particle size 300 microns) | 825 g (27.5%) |

The mixture is densified for five minutes at 3,000 rpm, the temperature at the end of the operation being 80° C.

The densified mixture is granulated on a HUTT G-25-40 apparatus for 3.75 minutes, the temperature of the rollers being maintained by oil at about 85° C.

The granules obtained possess good cohesion.

A mechanical mixture of 100 parts by weight of polyhexamethyleneadipamide granules and of two parts by weight of the granular masterbatch obtained above is produced in a screw extruder, the mixture being extruded under the following conditions: inlet temperature 220° C, centre temperature 280° C, outlet temperature 280° C, screw feed rate 10 kg/hour.

A smooth homogeneous white strand is obtained, which is immediately and rapidly cooled with water. After drying, the strand is granulated to give homogeneous granules which are introduced into the hopper of a screw injection moulding machine equipped with a mould in the shape of a small plate. Injection time 10 seconds, cooling time 4 seconds.

The small plates thus obtained are of a very homogeneous white, conforming to the type prepared in accordance with the conventional processes.

They furthermore have satisfactory opacity as well as good mechanical properties.

EXAMPLE 5

The same apparatus as in the preceding examples is used to carry out the densification of the following mixture:

| | |
|---|---|
| Titanium dioxide TiO$_2$ | 1,500 g (50%) |
| Poly(ethylene glycol terephthalate powder) | 100 g (3.333%) |
| Stearic acid, melting point 59° C | 375 g (12.5%) |
| Polyhexamethyleneadipamide of mean particle size 300 microns | 1,025 g (34.167%) |

The mixture is densified for 2 minutes at 1,500 rpm and three minutes at 2,000 rpm, the temperature at the end of the densification being 50° C; the mixture densified in this way is then granulated for 3.75 minutes, the oil heating the rollers being at a temperature of 60° C. The granulate obtained have good cohesion. They are mixed at the rate of 6% of masterbatch per 100% of polyhexamethyleneadipamide in the form of granules, the molten mixture being moulded in the same way as according to Example 4 to give small plates having a very satisfactory appearance and very satisfactory characteristics.

EXAMPLE 6

The densification of the following mixture is carried out in the same manner as in Example 5:

| | |
|---|---|
| C.I. Pigment Blue 28 (73,346) | 1,165 g (38.85%) |
| Cadmium sulphide | 335 g (11.15%) |
| "OP Wax", melting point 80 to 100° C | 375 g (12.5%) |
| Polyhexamethyleneadipamide of mean particle size 300 microns | 1,125 g (37.5%) |

The temperature at the end of the densification is 80° C.

The mixture is granulated on a HUTT G 25-40 apparatus, the temperature of the oil being 95° C; the granules obtained have good cohesion.

A mechanical mixture of 100 parts of polyhexamethyleneadipamide, two parts by weight of the masterbatch obtained above and 43.5 parts of glass fibres of 3 mm length is produced.

Extrusion on an extruder, but without a filter, is carried out under the same conditions as according to Example 4. Moulding is effected on a screw machine identical to that used in Example 4, with 10 seconds' injection under 50 bars, and 4 seconds' cooling.

The small plates obtained have a homogeneous green colour and possess good properties.

EXAMPLE 7

The following mixture is densified for three minutes at 1,000 rpm and two minutes at 2,000 rpm, the temperature at the end of the densification being 60° C.

| | |
|---|---|
| Cadmium sulphide | 300 g (10%) |
| Cadmium sulphoselenide | 300 g (10%) |
| Potassium bromide powder | 270 g (9%) |
| Copper stearate | 150 g (5%) |
| Manganese stearate | 180 g (6%) |
| Poly(ethylene glycol terephthalate) powder | 600 g (20%) |
| "OP Wax" of melting point 80 to 100° C | 300 g (10%) |
| Poly(ethylene glycol sebacate) | 150 g (5%) |
| Polyhexamethyleneadipamide of mean particle size 300 microns | 750 g (25%) |

The mixture densified in this way is granulated on a HUTT G 25-40 apparatus, the temperature of the oil being 90° C. The granules are mixed with polyhexamethyleneadipamide at the rate of 1 part per 100 parts. Moulding, identical to that carried out in Example 4, gives small plates of good characteristics, in particular having good heat resistance and light resistance as well as a homogeneous orange colour.

EXAMPLE 8

The following fillers are introduced into a high speed mixer of the "Papenmeier" type:

| | |
|---|---|
| Telasol Yellow RLSN (SANDOZ) (metallised azo dyestuff) | 1,500 g (50%) |
| Poly(ethylene glycol sebacate) | 375 g (12.5%) |
| Polyhexamethyleneadipamide powder of mean particle size 300 microns | 1,125 g (37.5%) |

Mixing is carried out for 3 minutes at a speed of 1,000 rpm and for 2 minuts at 1,500 rpm, the temperature at the end of the densification process being 50° C.

A masterbatch densified in this way is granulated very rapidly (duration of the order of 1 minute) whilst it is at 50° C, on a HUTT G 25-40 granulator, the temperature of the granulating rollers being maintained by circulation of oil at 125° C. The granules obtained have good cohesion. They are mixed with polyhexamethyleneadipamide, at the rate of 3 parts per 100 parts, by introduction into an extruder by means of a metering weigher.

The molten mixture is spun directly at a temperature of 285° C to give yarn of an intense and brilliant golden yellow.

EXAMPLE 9

The following fillers are introduced into a high speed mixer of "Papenmeier" type:

| | |
|---|---|
| Titanium dioxide | 1,364 g (45.454%) |
| Black MPFl (ferrous oxide) | 104 g (3.455%) |
| Blue MP 28 (cobalt aluminate) | 22 g (0.727%) |
| Yellow MP 136 (cadmium zinc sulphide) | 23 g (0.773%) |
| Poly(ethylene glycol terephthalate) powder | 545 g (18.182%) |
| "OP Wax" | 273 g (9.091%) |
| Poly(ethylene glycol sebacate) | 102 g (3.409%) |

| | |
|---|---|
| -continued | |
| Polycaprolactam of mean particle size 300 microns | 567 g (18.909%) |

The mixture is densified for 5 minutes at 3,000 rpm by means of a heated double jacket, the temperature at the end of the densification being 80° C.

The mixture is then granulated on a HUTT G 25-40 granulator for a period of 3.75 minutes, the temperature of the fluid heating the rollers being 90° C.

100 parts of polycaprolactam and 2.2 parts of the granules prepared above are introduced simultaneously into the feed chute of an extruder, the latter being regulated to the following temperatures: inlet 200° C, barrel 260° C, die 245° C.

After cooling in water and in air, the strand is granulated to give a thermoplastic moulding powder of a homogeneous grey colour.

This powder is moulded on a screw machine under the following conditions:

| | |
|---|---|
| Front temperature | 265° C |
| Middle temperature | 265° C |
| Back temperature | 260° C |
| Injection time | 10 secs |
| Cooling time | 10 secs |
| Moulding temperature | 20° C |

The moulded articles thus obtained have a homogeneous grey colour as well as good mechanical characteristics.

What we claim is:

1. Granules and pellets for modifying polycondensates which can be shaped in the molten state, characterised in that they consist of:
   at least 37.5% of polycondensates serving as a carrier, of which at least a part consists of the same polycondensate as that which is to be shaped, in the form of a powder of particle size at least 50 microns,
   from 12.5 to 40% of a binder of melting point 70°–100° C which is compatible with the polycondensate to be shaped, and
   up to 50% of at least one compound useful to modify the polycondensate which is to be shaped.

2. Granules and pellets according to claim 1, useful for colouring melt-spinnable polycondensates, characterized in that they consist of:
   at least 37.5% of the same polycondensate as that which is to be spun, in the form of a powder of particle size of at least 50 microns,
   from 12.5 to 15% of a binder of melting point 70°–100° C which is compatible with the polycondensate to be spun, and
   up to 50% of at least one dyestuff which is soluble in the polymer to be spun and can withstand a temperature which is about 10% above the melting point of the polymer to be spun, for at least 15 minutes.

3. Granules and pellets according to claim 2, characterised in that the binder used in poly(ethylene glycol sebacate).

4. Granules and pellets according to claim 1, intended for the modification of mouldable polyamides, characterised in that they consist of:
   at least 37.5% of polycondensates serving as a carrier, of particle size at least 50 microns, of which at least 10% relative to the mixture constituting the granules or pellets consist of said mouldable polyamides,
   from 12.5 to 40% of a binder of melting point 70°–100° C which is compatible with the polymer to be shaped, and
   up to 50% of at least one compound intended to modify the polycondensate to be shaped.

5. Granules and pellets according to claim 1, characterised in that the binder used is selected from the group consisting of poly(ethylene glycol sebacate), saponified esters of montan acids possessing 26 to 32 carbon atoms in the molecule, and their mixtures.

6. Process for obtaining granules and pellets characterised in that it comprises:
   a. the densification of a mixture containing:
   at least 37.5% of polycondensates serving as a carrier, of which at least a part consists of the same polycondensate as that which is to be shaped, in the form of a powder of particle size at least 50 microns,
   from 12.5 to 40% of a binder of melting point 70°–100° C which is compatible with the polymer to be shaped and,
   up to 50% of at least one compound intended to modify the polycondensate to be shaped, by means of a turbo-mixer, the temperature at the end of the operation being above the melting point of the binder, and
   b. the forming of granules or pellets from said mixture by means of a compacter or pelletiser, at a temperature at least equal to the melting point of the binder, the densified mixture being introduced at a temperature of at least about 50° C.

7. Shaped articles made of polycondensates modified by means of the granules or pellets of claim 1.

* * * * *

UNITED STATES PATENT AND TRADEMARK OFFICE
CERTIFICATE OF CORRECTION

PATENT NO. : 4,076,667
DATED : February 28, 1978
INVENTOR(S) : Daniel FONTANEL et al It is certified that error appears in the above-identified patent and that said Letters Patent are hereby corrected as shown below:

The priority claim was omitted and should be inserted as follows:

--France, Patent Appln. No. 75/08830 filed March 19, 1975--.

Signed and Sealed this

Thirteenth Day of June 1978

[SEAL]

Attest:

RUTH C. MASON
*Attesting Officer*

DONALD W. BANNER
*Commissioner of Patents and Trademarks*